(12) United States Patent
Godøy

(10) Patent No.: US 11,874,422 B2
(45) Date of Patent: Jan. 16, 2024

(54) STEERING OF MARINE EQUIPMENT TOWED BY A VESSEL BY A RUNNING BLOCK

(71) Applicant: SHEARWATER INVEST AS, Laksevåg (NO)

(72) Inventor: Erik Godøy, Nesbru (NO)

(73) Assignee: SHEARWATER INVEST AS, Laksevåg (NO)

(*) Notice: Subject to any disclaimer, the term of this patent is extended or adjusted under 35 U.S.C. 154(b) by 0 days.

(21) Appl. No.: 17/908,673

(22) PCT Filed: Mar. 2, 2021

(86) PCT No.: PCT/NO2021/050052
§ 371 (c)(1),
(2) Date: Sep. 1, 2022

(87) PCT Pub. No.: WO2021/182965
PCT Pub. Date: Sep. 16, 2021

(65) Prior Publication Data
US 2023/0161064 A1    May 25, 2023

(30) Foreign Application Priority Data
Mar. 11, 2020    (NO) .................................. 20200298

(51) Int. Cl.
*G01V 1/38* (2006.01)
*B63B 21/66* (2006.01)
*G01V 1/20* (2006.01)

(52) U.S. Cl.
CPC ............ *G01V 1/3826* (2013.01); *B63B 21/66* (2013.01); *G01V 1/201* (2013.01); *G01V 1/3861* (2013.01)

(58) Field of Classification Search
CPC ....... G01V 1/3826; G01V 1/201; B63B 21/66
USPC ............................. 367/16, 17; 114/246, 253
See application file for complete search history.

(56) References Cited

U.S. PATENT DOCUMENTS

| 7,415,936 | B2* | 8/2008 | Storteig | G01V 1/3861 |
| | | | | 114/253 |
| 8,462,581 | B2* | 6/2013 | Langeland | G01V 1/3861 |
| | | | | 367/16 |
| 8,891,331 | B2* | 11/2014 | Barker | G01V 1/3826 |
| | | | | 114/244 |
| 8,891,332 | B2* | 11/2014 | Tonchia | G01V 1/3861 |
| | | | | 114/244 |
| 2013/0155805 | A1* | 6/2013 | Tonchia | G01V 1/3817 |
| | | | | 367/16 |

* cited by examiner

*Primary Examiner* — Ian J Lobo
(74) *Attorney, Agent, or Firm* — Flener IP & Business Law; Zareefa B. Flener

(57) ABSTRACT

The present invention relates to the field of marine towing operations for marine seismic survey systems and seismic data gathering. More specifically, the present invention relates to seismic sources and receiver sensor cables, streamers, floats etc., that have means for adjusting and keeping a desired position in an array during a tow behind a vessel. The apparatus comprises a pulley apparatus, being a kind of miming block (1), connected with and supporting marine equipment (3, 3'). The miming block (1) is configured to attach to the deflected lead wire or tow wire (2, 9). It has means for traveling along the wire (2, 9).

9 Claims, 5 Drawing Sheets

STEERING OF MARINE EQUIPMENT TOWED BY A VESSEL BY A RUNNING BLOCK

FIELD OF THE INVENTION

The invention is related to the field of marine towing operations. More specifically to a marine seismic survey systems and seismic data gathering, wherein seismic sources and receiver sensor cables, streamers, floats etc., have means for adjusting and keeping a desired position in an array during a tow behind a vessel.

DESCRIPTION OF RELATED ART

In the field of seismic marine surveying, acoustic energy is generated by seismic sources such as air guns. The pressure pulses propagate downwardly to the seabed and deeper geological layers. The reflected pulses are registered by the receiver sensors attached to cables and seismic streamers. This data is then processed to map the underlying geological structures. There will be several streamers towed behind the vessel forming an array covering a large area and the length of streamer cables towed by the vessel are often up to 10-12 kilometres. The area (grid) is often a lot wider than the towed array, so the vessel must turn and tow the array in lapses across the grid. A multiple streamer array and sources are dependent on means for directing and positioning the streamer cables outwardly with a set distance between them and positioning the source array correctly. Also, the towed array and vessel, will be subject to wind, waves and currents which will affect the position of different components of the towed array. To pull streamers outwardly from the vessel and control the position of the source array it is well known to use of means like otterboards, deflectors/diverters, wings/fins, rudders etc., either in a fixed position or adjustable by different means of which the following prior art discloses.

GB 2122562 (Breugelmans, pub. Date: Jan. 18, 1984) describes a paravane/trawl door with a hydrofoil profile with motoring means for controlling bridles and the angle of attack when towed through the water, the trawl door designed for lateral deflecting of a seismic source/streamer array.

EP 0018053 (Lamb, (Shell) patent Dec. 7, 1983) describes a manual or automatic positioning of seismic sources by using floats with remotely adjustable rudders/fins.

WO 98/24685 (Russel, pub. Date: Jun. 11, 1998) describes a system with active deflectors in a seismic streamer array where there are adjustable fins on deflector but also depend on a support vessel.

WO 2004/086092 (Helgerud et al. pub. Date: Oct. 7, 2004) describes a system and adjustment of deflectors in a seismic streamer array, by changing the bridle angle and tow points of deflector door. The adjustments are made by hydraulic and or motoring means. Reference is made to U.S. Pat. No. 5,357,892, Vatne.

U.S. Pat. No. 3,331,050 (Kilmer, patent Jul. 11, 1967) describes the use of submerged paravanes with wings and or rudders to support and control position of seismic sources.

U.S. Pat. No. 4,574,723 (Chiles et al. patent Mar. 11, 1986) discloses a paravane handling system and mechanism for controlling a wing shaped paravane or deflector.

U.S. Pat. No. 7,404,370 (Stokkeland, Jul. 29, 2008) discloses a paravane with float and steerable diverter for lateral force in a seismic streamer array.

U.S. Pat. No. 8,100,078 (Storteig et al., patent Jan. 24, 2012) discloses a steerable hydrofoil for remotely control of streamers and position of other marine seismic equipment.

The following publications disclose different systems for controlling the seismic source arrays independently of the streamer array in a combined tow.

U.S. Pat. No. 8,462,581 (Langeland, patent Jun. 11, 2013) describes that both the laterally and or longitudinally position of the source arrays between vessel and outward deflectors can be controlled by the means of wire and winching system.

U.S. Pat. No. 7,415,936 (Storteig et al., patent Aug. 26, 2008 discloses a seismic survey system using one or more winches placed on vessel or within the tow in the water for adjusting the source array.

U.S. Pat. No. 8,228,756 (Toennesen, patent Jul. 24, 2012) discloses apparatus and method for remotely controlling position of a source array using active deflectors in a seismic streamer array. Prior art of deflectors is described along with methods for adjustable fins on deflectors both on lateral lead for streamers and for source array.

U.S. Pat. No. 9,696,446 (Howlid et al., patent Jul. 4, 2017.) describes almost the same features as the above mentioned patents with regards to deflectors and adjustment of wings, rudders, and a winch attached to the tow cable between the tow vessel and the source-array. This publication has a broad listing of prior art.

Use of otter boards, wings, diverters, trawl doors as used in the fishing industry and such other type deflectors are widely used and has been used for decades. However, it is a method which has its limitation with regards to accurate positioning of seismic equipment in the water as it is totally dependent on the speed of tow. However as shown in prior art paravanes, floats and deflectors have been shown with adjustable rudders/fins which comprise of rather many parts and are quite complex. To adjust the source array and streamer array independently, will demand for a number of deflectors and therefore may be a complex and costly solution.

By use of winches in the water as shown by U.S. Pat. Nos. 7,415,936 and 9,696,446 would be complex and could be a disadvantage regarding maintenance.

The inventor seeks to present a simple and easy system and apparatus for control of a seismic survey system and to solve the limitations of prior art.

BRIEF SUMMARY OF THE INVENTION

The invention, apparatus and system for steering of a seismic source array, comprise of a controllable pulley/running block and system for support of seismic equipment as a source and streamer array. The running block is configured to attach to the deflected lead wire or tow wire with means and rotary power for travel along wire.

The invention therefore seeks to present a simpler alternative to present art.

BRIEF DESCRIPTION OF THE DRAWINGS

The foregoing aspects and many of the advantages of the present invention will be more appreciated and better understood by reference to the following detailed description, when taken in conjunction with the accompanying drawings, wherein.

DETAILED DESCRIPTION OF THE INVENTION

Figure 1:
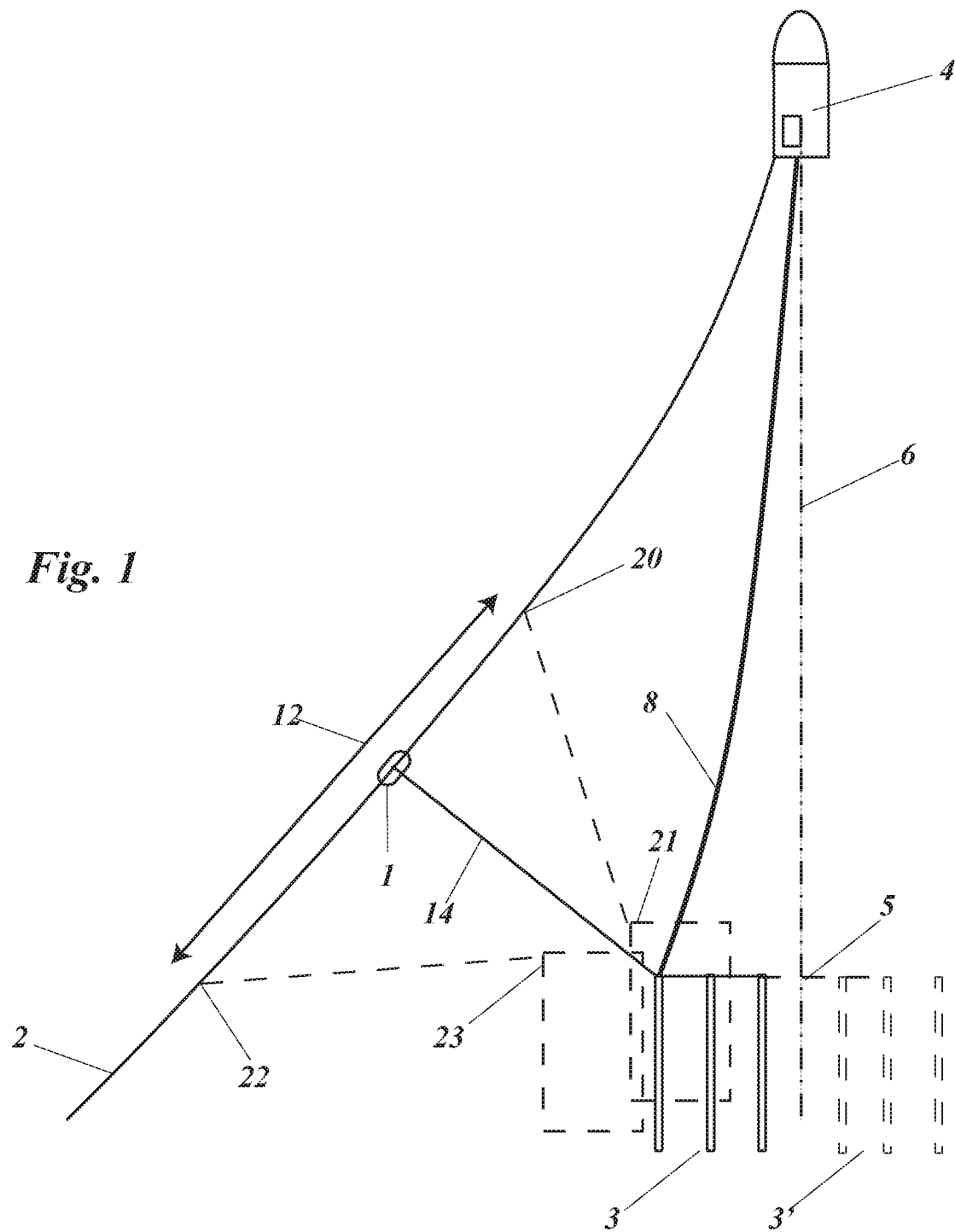
FIG. 1 shows an overview of an embodiment of a pulley system for seismic source towed behind a vessel.

Disclosed in FIG. 1 is shown an embodiment of the invention, representing a system with use of a pulley/running-block 1 movable along a deflected lead 2 for use in marine seismic survey systems and seismic data gathering, Seismic sources (seismic guns) 3 towed behind a vessel 4 as part of a seismic survey array. There will be typically at least three of these sources on either side of centreline 6, each of the outer having means for steering according to the invention. Seismic receiver sensor cables, streamers, are deflected and towed further behind the source array 3, not shown but in a manner as known from prior art. Lead cable 2 is laterally deflected for spread of streamer array, not shown. About centreline 6, everything is mirrored.

FIG. 1 shows an overview of the tow where running-block 1 is movable along lead 2 as illustrated by arrow 12. The source 3 is connected by wire 14 to running-block 1. As the running-block 1 moves along lead 2, source 3 is pulled laterally in the water relative to centreline 6 and the total tow of streamer array. Possible new positions of the running block and source array 3 is indicated by dotted lines with numerals 20-23. The sources 3, 3' may be independently towed and positioned about centreline 6 or connected as one array by wire 5.

Figure 2:
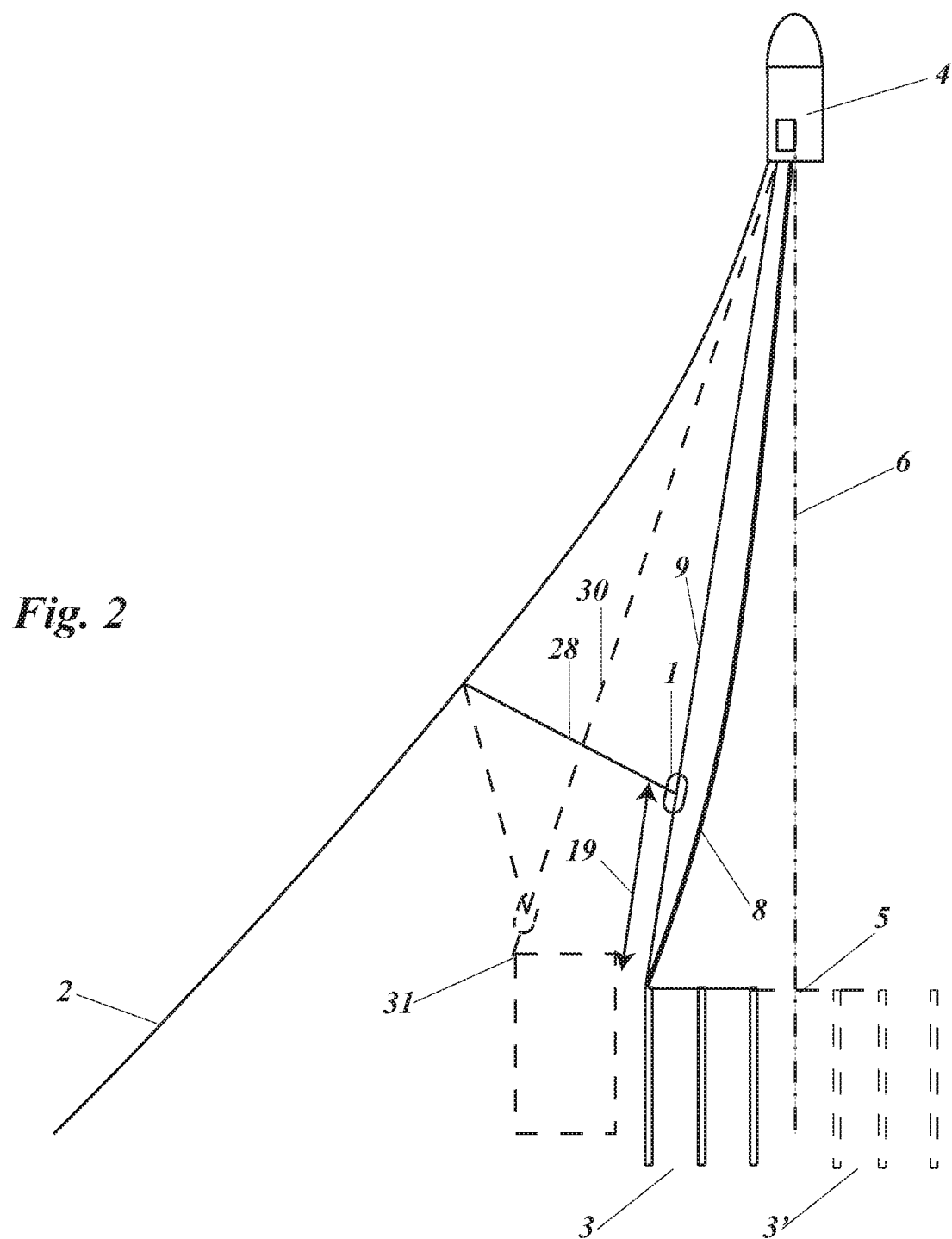
FIG. 2 shows an overview of a second embodiment of a pulley system for seismic source towed behind a vessel.

FIG. 2 shows an overview of a second embodiment where running-block 1 is movable along a tow line 9 and as illustrated by arrow 19. The source 3 is connected to tow line 9 and umbilical 8. The running-block 1 is fixed to the lead 2 by wire 28. As the running-block 1 moves along tow 9, source 3 is pulled laterally in the water relative to centreline 6 and the total tow of streamer array. Possible new position of the tow 9, running block and source array 3 is indicated by dotted lines with numerals 30-31.

Figure 3A:
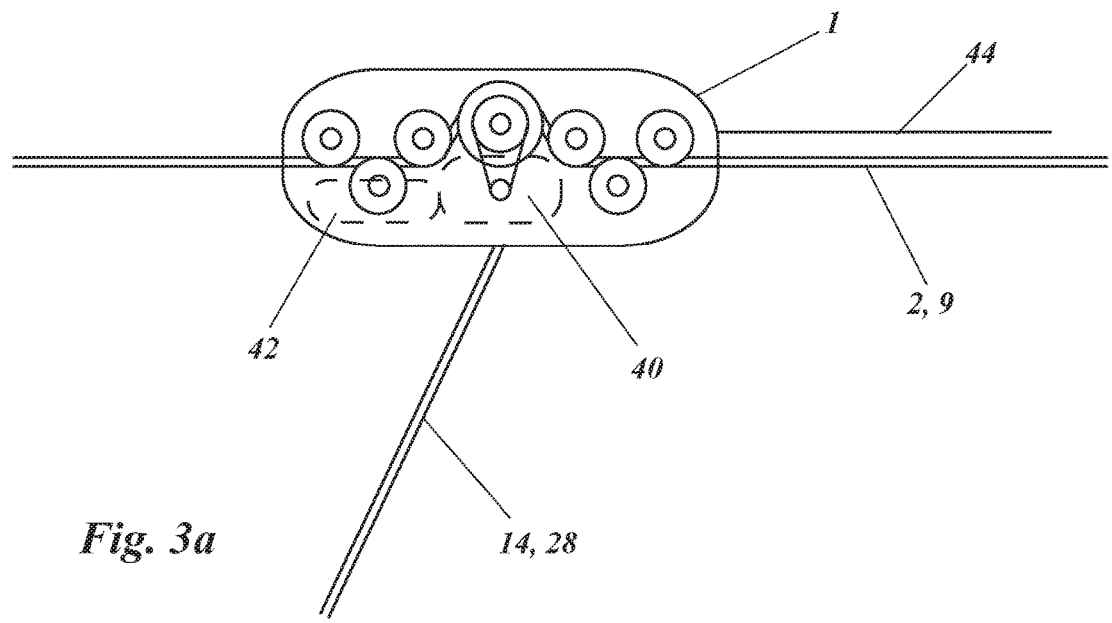
FIGS. 3a and 3b show a motorized running block and running block within a pulley system.

FIG. 3a shows the running-block 1, attached to lead 2, or tow line 9. It will preferably have an electric motor 40, powered from a local battery 42, or by cable 44 from vessel. Control will be through wireless means or wire from vessel. Connection to source is by wire 14 or 28.

Figure 4:
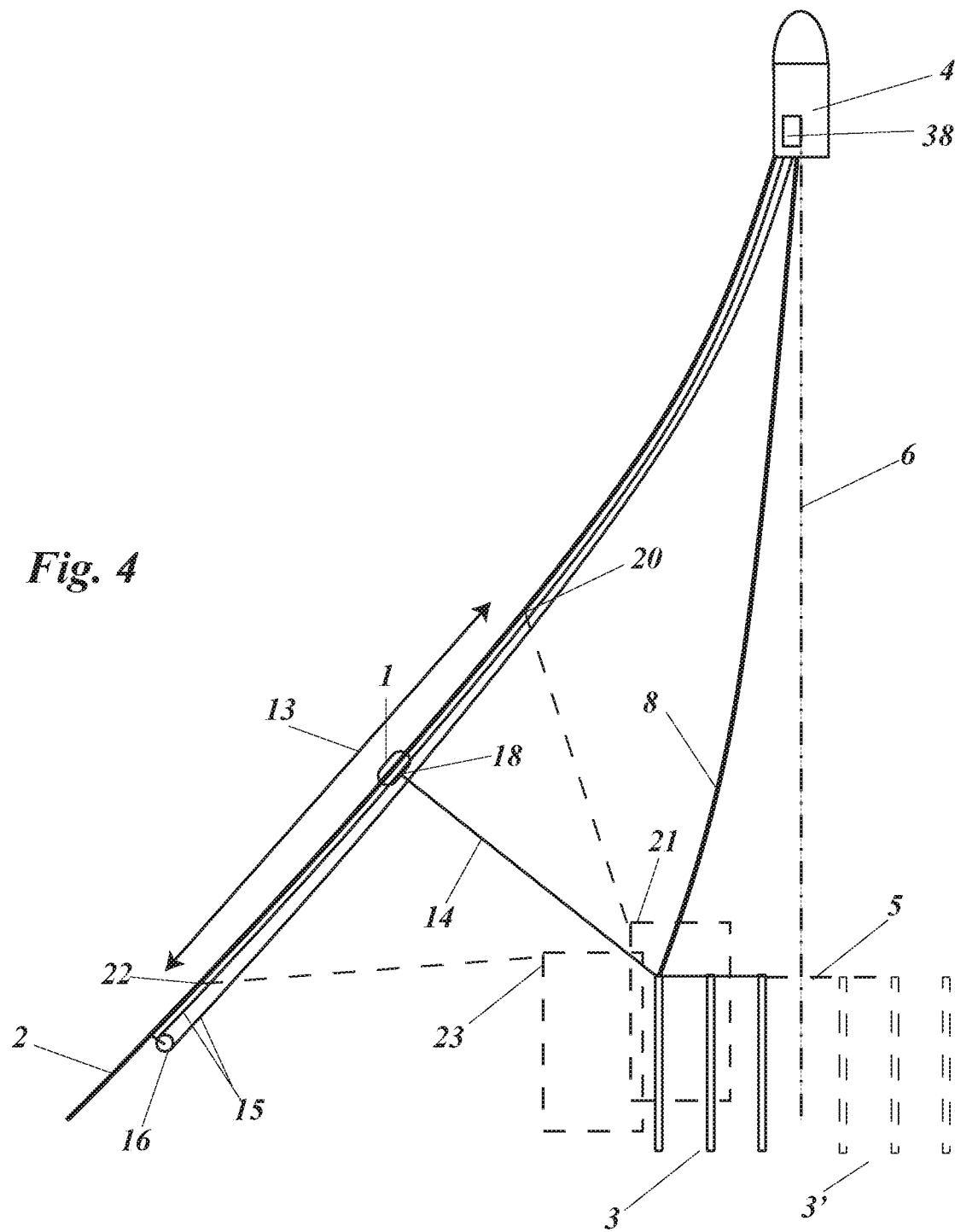
FIG. 4 shows an overview of a third embodiment of a pulley system for seismic source towed behind a vessel.

FIG. 4 shows a third embodiment where running-block 1 is movable along a lead line 2 as illustrated by arrow 13, whereas the positioning is created by wire 15 running on pulley 16. The running block is fixed at a point 18 on wire 15, the wire 15 is pulled in both directions from motorized reel 38 on vessel 4. The positioning of this pulley system may also be positioned along tow wire 9 as shown in FIG. 2.

Figure 3B:
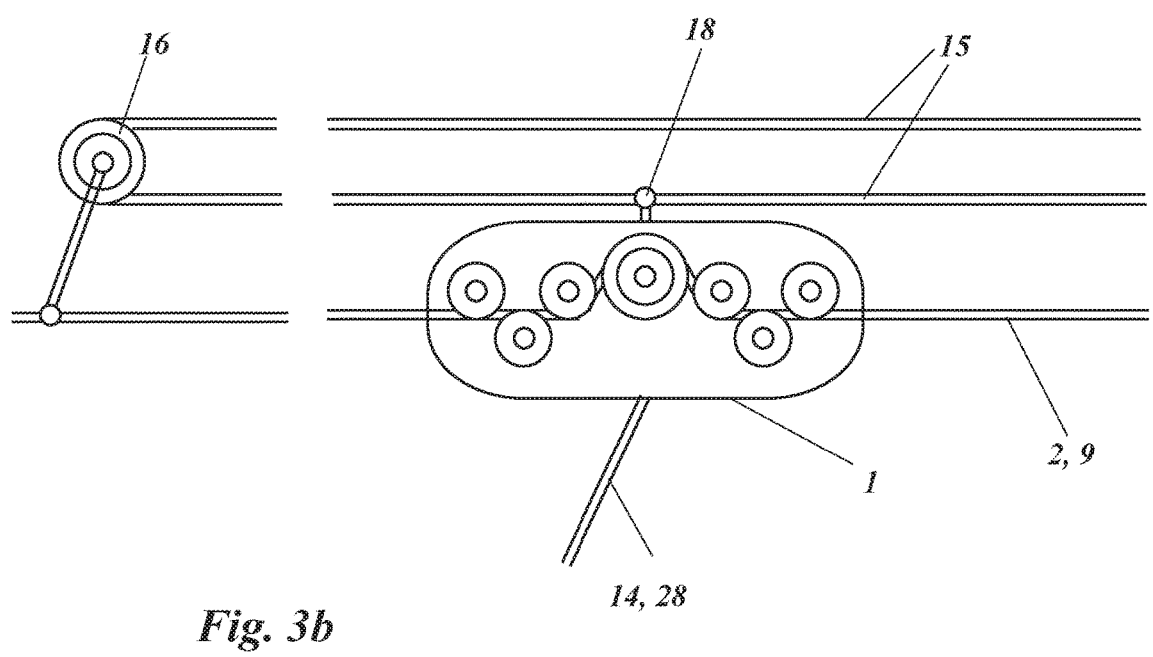

This third embodiment of a pulley system is further illustrated in FIG. 3b where running block 1 is connected 18 to wire 15 turning on pulley 16, the wire powered both ways from reel 38 on vessel.

Figure 5:
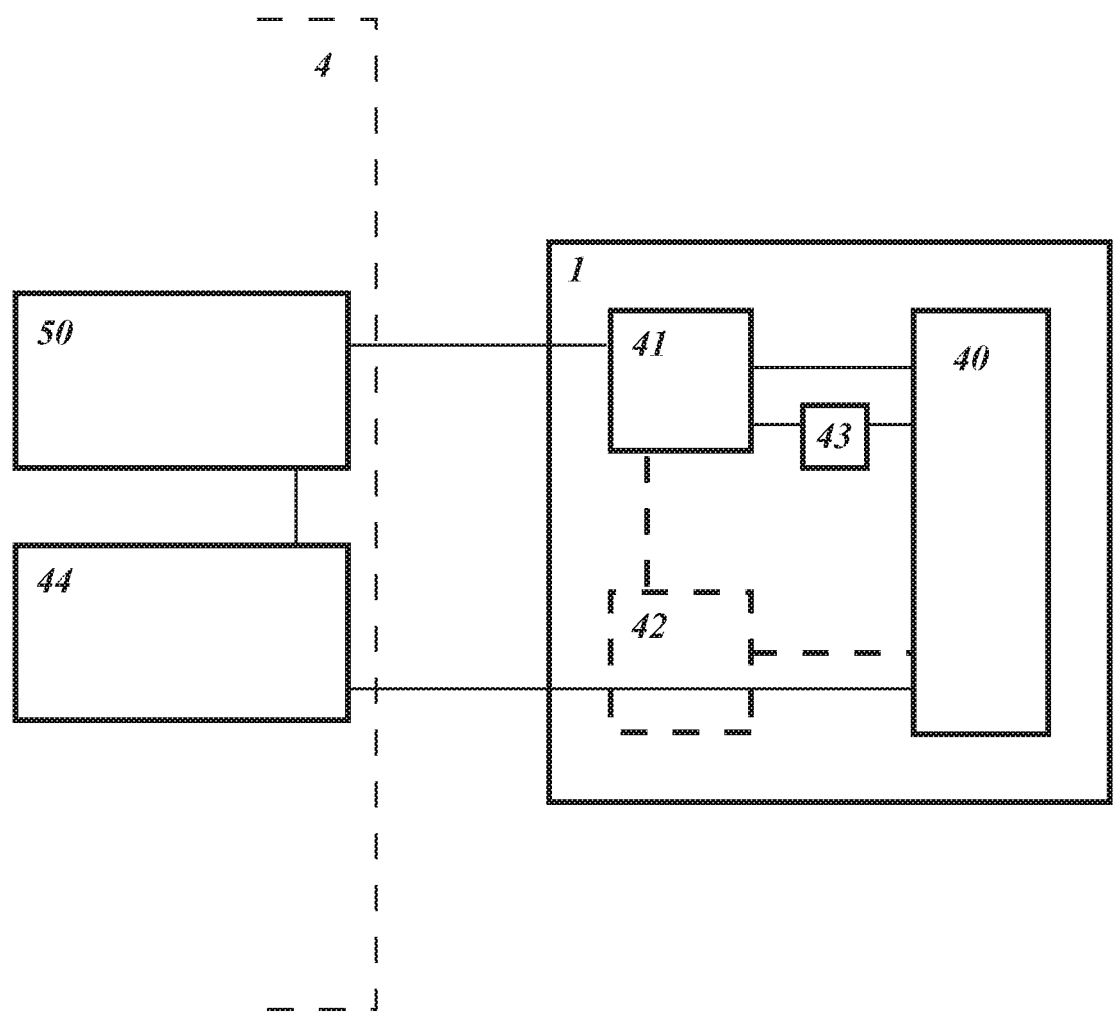
FIG. 5 illustrate by block schematic, remote control of running block system.

FIG. 5 illustrates the remote control system of the invention. As illustrated by FIGS. 1-3a, show embodiments using a motorized running block 1 moving along lead 2 or tow wire 9. The motor 40 is connected to a local control unit (relay) 41 and sensor 43, the latter for reading position along lead or wire. Power 44 is provided directly from vessel or locally from battery 42. Master control unit 50 of the system is placed on vessel and connected with running block 1 by cable or a wireless radio system.

With reference to FIGS. 3b and 4, which is a pulley system with motorized reel 38, it should be understood that this will also have a sensor for positioning along lead or wire.

The invention therefore by these disclosures enables adjusting and keeping a desired position of a source array during the tow and operation.

The invention described can be subject to modifications and variations without thereby departing from the scope of the inventive concept as disclosed with reference to the drawings and further stated in the claims. To the extent that certain functional elements can be replaced by other elements to enable the same function to be performed by the various embodiments disclosed, such technical equivalents are included within the scope of the invention.

The invention claimed is:

1. An apparatus and system for positioning marine seismic equipment when towed behind a vessel at sea, comprising
a pulley apparatus being a controllable running block, connected with and supporting marine seismic equipment, wherein
the controllable running block (1) is configured to attach to a deflected lead wire (2) or a tow wire (9),
the controllable running block (1) has pulleys configured to attach to said deflected lead wire (2) or tow wire (9), and an electric motor (40) to provide rotary power for travel along said deflected lead wire (2) or tow wire (9), and
the controllable running block (1) having means for connecting to the marine seismic equipment (3, 3').

2. The apparatus and system according to claim 1, wherein
the controllable running block (1) when configured to attach to the deflected lead wire (2) is connected by a first wire (14) thereby providing a first wire connection to a seismic source and/or other seismic equipment, and
the controllable running block (1) when configured to attach to the tow wire (9) for the seismic source and/or other seismic equipment is connected by a second wire (28) thereby providing a second wire connection connected to the deflected lead wire (2).

3. The apparatus and system according to claim 2, wherein each of said first and second wire connections is adjustable in length.

4. The apparatus and system according to claim 1, wherein the controllable running block (1) is remotely controllable from the vessel (4) by use of a wireless or cable connected system (50), the controllable running block having means for power locally (42) or power (44) is provided by a cable from the vessel for running of the electric motor (40) and a sensor (43) for reading positioning along the lead or tow wire (2, 9).

5. An apparatus and system for positioning marine seismic equipment when towed behind a vessel at sea, comprising
a pulley apparatus being a controllable running block, connected with and supporting marine seismic equipment, wherein
the controllable running block (1) is configured to attach to a deflected lead wire (2) or a tow wire (9),
the controllable running block (1) has pulleys configured to attach to said deflected lead wire (2) or tow wire (9), and fixed to a wire (15) and a pulley system (16)

connected to a motorized reel (38) on the vessel (4), for travel along the deflected lead wire (2) or tow wire (9), and the controllable running block (1) having means for connecting to the marine seismic equipment (3, 3').

6. The apparatus and system according to claim 5, wherein the controllable running block (1) is remotely controlled from the vessel (4) by use of a pulley and reel system (38) placed on-board the vessel (4), and a sensor (43) is located on the controllable running block for reading position along the deflected lead wire (2) or tow wire (9).

7. The apparatus and system according to claim 5, wherein the controllable running block (1) when configured to attach to the deflected lead wire (2) is connected by a first wire (14) thereby providing a first wire connection to a seismic source and/or other seismic equipment, and the controllable running block (1) when configured to attach to the tow wire (9) for the seismic source and/or other seismic equipment is connected by a second wire (28) thereby providing a second wire connection to the deflected lead wire (2).

8. The apparatus and system according to claim 7, wherein each of said first and second wire connections is adjustable in length.

9. The apparatus and system according to claim 5, wherein said controllable running block (1) is fixed at a point (18) on the wire (15), and the wire (15) is pulled in both directions from said motorized reel (38) on the vessel (4).

\* \* \* \* \*